Figure 1:
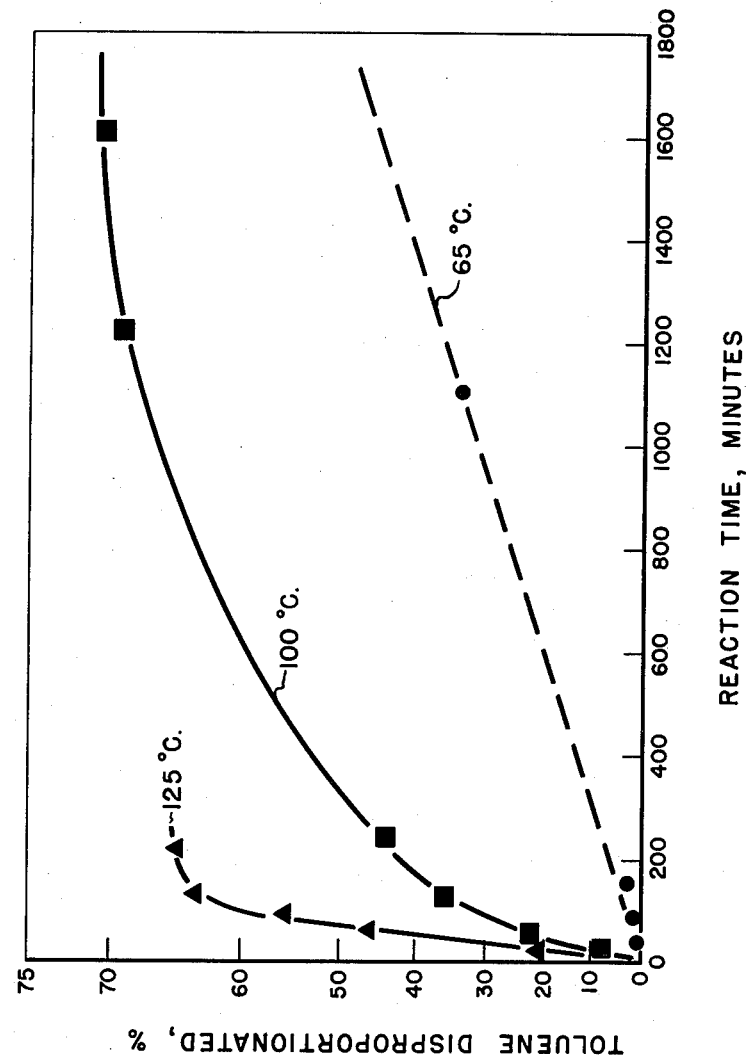
Figure 2:
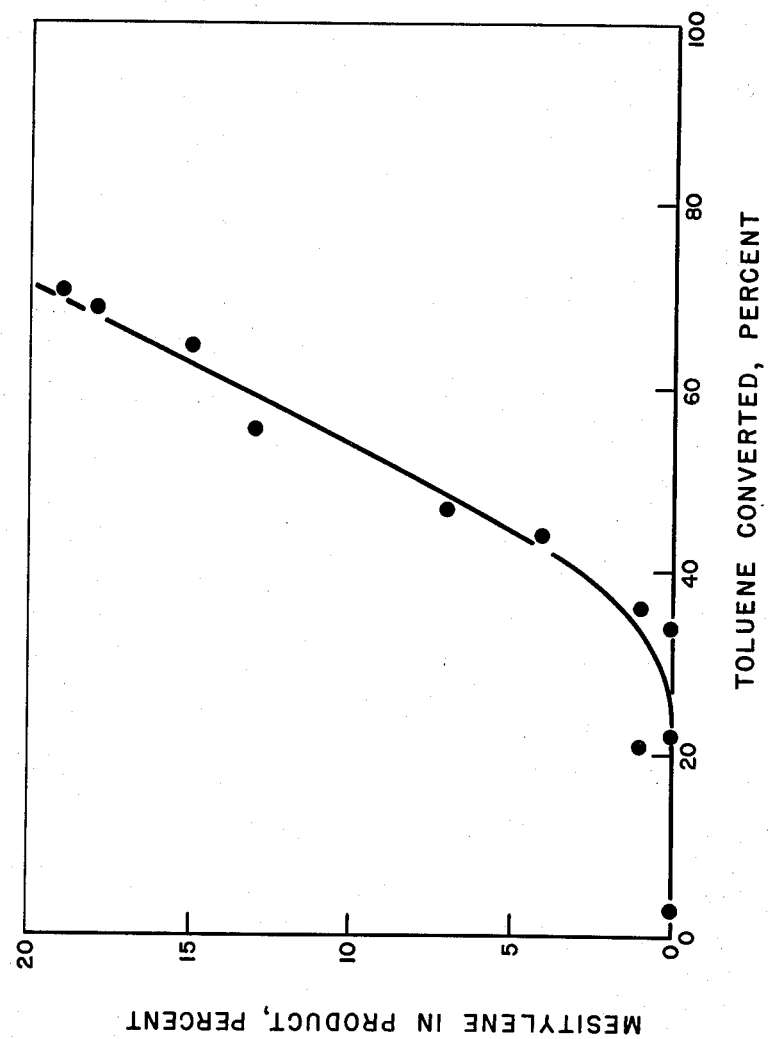

3,006,977
DISPROPORTIONATION OF TOLUENE
David A. McCaulay, Homewood, Ill., assignor to Standard Oil Company, Chicago, Ill., a corporation of Indiana
Filed Aug. 22, 1960, Ser. No. 51,223
10 Claims. (Cl. 260—672)

This invention relates to a process for the disproportionation of toluene to produce benzene and polymethyl benzenes. More particularly, this invention is concerned with a process for the conversion of toluene in a quantity in substantial excess of the thermodynamic equilibrium quantity to benzene and xylene and/or mesitylene.

It is known in the art that certain alkyl benzenes other than toluene can be disproportionated with a $BF_3$ catalyst in the presence of HF. For example, A. P. Lien et al., U.S. 2,528,893, patented November 7, 1950, disclosed a method for the disproportionation of ethyl benzene to diethyl benzene and benzene in good yields. Also, A. P. Lien et al., U.S. 2,564,073, patented August 14, 1951, disclose the disproportionation of xylene to trimethyl benzene in good yields. However, it has heretofore been thought impossible to disproportionate toluene in good yield. Toluene contains only one alkyl group on the aromatic ring and the alkyl group is a methyl group. It is extremely difficult to remove the methyl group from the toluene nucleus and place it on another toluene nucleus by disproportionation. Therefore, it has heretofore been impossible to disproportionate toluene for production of good yield of polymethyl benzenes without undue destruction of the reaction conversion product by cracking and condensation.

I have now provided a process for disproportionation of toluene at high rates without the formation of undesirable by-products due to cracking and condensation. The process of this invention is a process for disproportionating toluene to benzene and polymethyl benzene with an HF—$BF_3$ catalyst. The polymethyl benzenes which may be produced in accordance with the present invention are xylene and mesitylene. Either or both of these polymethyl benzenes may be produced in a quantity in substantial excess of the thermodynamic equilibrium quantity.

The process of this invention is carried out by contacting toluene with at least about 0.3 part by weight of $BF_3$ and at least about 0.2 part by weight of liquid HF per part by weight of toluene desired to be converted, i.e., disproportionated. The contacting is carried out at a temperature in the range of from about 80° C. to about 125° C. at a pressure sufficient to maintain HF in the liquid state. After contacting, the desired polymethyl benzene is separated from the contact mixture as a disproportionation product. Although I have found that disproportionation of toluene in the presence of $BF_3$ and HF occurs to a very slight degree at room temperature, the reaction is extremely slow and only at 80° C., and more advantageously 100° C., does the reaction become fast enough for commercial processing. The preferred temperature range is from about 100° C. to about 125° C. At 125° C. the disproportionation reaction is much faster; however, it is not commercially desirable to operate at a temperature higher than 125° C. because small amounts of cracked products and tar begin to appear. Cracking and other side reactions become excessive above 125° C.

The process of this invention employs at least about 0.3 and preferably at least about 0.5 part by weight of $BF_3$ and at least about 0.2 part by weight of liquid HF. It is not necessary to employ more than 3.0 parts by weight of $BF_3$ and 3.0 parts by weight of liquid HF, although excesses of both of these components may be used if desired. The preferred range of use of each of HF and $BF_3$ is 0.5 to 1.5 parts by weight. All parts by weight disclosed hereinabove are based on parts by weight of toluene.

The contacting is carried out for a period of time sufficient to produce the desired product. Normally at least about 30 minutes and no greater than about 8 hours will be required. The time should be related to reaction temperature to obtain the desired conversion to the desired product and to minimize side reactions and tar formation.

As disclosed above, the process of this invention may be used to produce xylene and/or mesitylene. The reaction is controlable to selectively produce one or the other of these two products as well as mixtures of both. Benzene is, in all cases, also produced from the disproportionation and may, if desired, be separated as a high-purity benzene product. Separation of product, i.e., xylene or mesitylene or both, as well as benzene, may be accomplished by any means known to the art. After contacting for a period sufficient to convert toluene to the desired product, the HF and $BF_3$ may conveniently be distilled from the reaction mixture and the reaction products may be separated by distillation. For example, the reaction, i.e., contacting, may be carried out in a batch-type reactor equipped with mechanical agitation or in a tower-type reactor. The reaction products may be withdrawn from the reactor and subjected to stripping action to completely remove HF and $BF_3$; stripping may also be accomplished in situ in the reactor. The hydrocarbons are thereafter fractionated to separate a benzene stream; a toluene stream containing unconverted toluene which may be recycled to the reactor or may be charged to another contacting step, a xylene stream, and a mesitylene stream.

In another embodiment of the present process, where mesitylene is produced as a product, only a portion of the $BF_3$ is flashed off. The mesitylene is produced in the reaction as a complex with HF and $BF_3$ containing one mole of $BF_3$ per mole of mesitylene. Thus, in the present embodiment, one mole of $BF_3$ is retained per mole of mesitylene in the product to maintain the complex. The reaction product mixture is then cooled to ambient temperature and a diphasic separation occurs, mesitylene being concentrated as the lower phase HF–$BF_3$ complex dissolved in liquid HF and the bulk of the benzene, toluene and xylene being separated as raffinate. The raffinate is then fractionated, if desired, such as by distillation to obtain each component as a product.

EXAMPLES

In order to illustrate the process of this invention, the runs set out in the table below were made. Each run consisted of a batch disproportionation in an autoclave provided with a magnetic-actuated stirrer with the amounts of HF and $BF_3$ indicated in the table and at pressures indicated for each run. In each run, samples of the products were withdrawn at intervals (reported as reaction time in minutes in the table) and were analyzed by gas chromatography.

Table
DISPROPORTIONATION OF TOLUENE

| Run No | I | | | II | | | | | | III | | | | | | IV | | | | | |
|---|---|---|---|---|---|---|---|---|---|---|---|---|---|---|---|---|---|---|---|---|---|
| Temp. °C | 23 | | | 65 | | | | | | 100 | | | | | | 125 | | | | | |
| Pressure, p.s.i.g | 475 | | | 800 | | | | | | 1,075 | | | | | | 1,200 | | | | | |
| Catalyst, g./g. toluene: | | | | | | | | | | | | | | | | | | | | | |
| HF | 1.22 | | | 0.60 | | | | | | 0.58 | | | | | | 0.58 | | | | | |
| $BF_3$ | 1.14 | | | 0.68 | | | | | | 0.77 | | | | | | 0.67 | | | | | |
| Reaction time, min | 30 | 61 | 3923 | 43 | 91 | 155 | 1109 | 2584 | 6889 | 30 | 60 | 126 | 246 | 1228 | 1605 | 30 | 61 | 95 | 133 | 223 | 1148 |
| Product distribution: | | | | | | | | | | | | | | | | | | | | | |
| Benzene | 0.1 | 0.1 | 1.5 | 0.3 | 0.9 | 1.9 | 17 | 24 | 41 | 4 | 9 | 15 | 22 | 42 | 41 | 11 | 26.0 | 30 | 32 | 32 | 7 |
| Toluene | 99.9 | 99.9 | 97.0 | 99.4 | 98.2 | 96.2 | 66 | 47 | 32 | 92 | 78 | 64 | 56 | 31 | 29 | 79 | 53.5 | 44 | 35 | 32 | 11 |
| Xylene | 0.0 | 0.0 | 1.5 | 0.3 | 0.9 | 1.9 | 17 | 27 | 11 | 4 | 13 | 20 | 18 | 9 | 11 | 9 | 13.0 | 12 | 12 | 11 | 1 |
| Mesitylene | 0.0 | 0.0 | 0.0 | 0.0 | 0.0 | 0.0 | 0 | 2 | 16 | 0 | 0 | 1 | 4 | 18 | 19 | 1 | 7.0 | 13 | 15 | 13 | 2 |
| Light Paraffins | | | | | | | | | | | | | | | | | 0.5 | 1 | 1 | 2 | 1 |
| Tar | | | | | | | | | | | | | | | | | | | 5 | 10 | 78 |

With reference to the data reported above, the reaction proceeded so slowly below 100° C. that it was virtually impossible to obtain a good yield of xylene or mesitylene within a reasonable period of time. At 100° C. and 125° C. the process yielded good yields of xylene and mesitylene, depending upon reaction times. At 125° C., after the reaction had proceeded for an extensive length of time, small amounts of cracked products and tar began to appear. The cracked products and tar were produced in run IV at a rate of 2% per hour. At reaction periods in excess of 8 hours, tar formation became excessive. In the above examples, very little high molecular weight contaminant was detected.

FIGURE I of the drawings is a curve of percent of toluene converted plotted against reaction time in minutes. FIGURE II illustrates a curve of percent of mesitylene in the product plotted against percent toluene converted.

Now turning to FIGURE I, it is seen that the curves at 100° C. and at 125° C. level off and appear to approach equilibrium at about 70% conversion. The products obtained depend upon the extent of conversion as shown in FIGURE II. With reference to FIGURE II, below about 30% conversion the products are exclusively benzene and m-xylene. Above about 30% conversion, mesitylene begins to appear, and up to 70% conversion, various mixtures of xylene and mesitylene are produced. At 70% conversion, mesitylene comprises 20% of the product and, therefore, predominates as the polymethyl benzene.

With regard to the data of the examples above and with regard to the figures, it is concluded that if it is desired to produce benzene and xylene as the predominant or even exclusive product, then conversions per pass should be limited to 30% or less. If it is desired to maximize benzene production, in such a manner as to obtain mesitylene as a by-product or if it is desired to produce mesitylene as the conversion product, conversions per pass should be in the high range, above about 60 to 70%.

For 30% conversion, with reference to the above examples, about 40–45 minutes are required at 125° C. and about 90–110 minutes at 100° C. For 60–70% conversions, about 100–120 minutes reaction time are required at 125° C. and about 270–300 minutes at 100° C. From the disclosures herein, other reaction times may conveniently be selected and utilized by those skilled in the art.

It is evident from the foregoing that I have provided a process for disproportionating toluene to produce benzene and polymethyl benzenes in good yields with a minimum of side reactions.

I claim:

1. A process for the disproportionation of toluene to produce a polymethyl benzene selected from the class consisting of xylene and mesitylene which process comprises contacting toluene, at a temperature in the range of from about 80° C. to about 125° C. at a pressure sufficient to maintain HF in the liquid state, with at least about 0.3 part by weight of $BF_3$ and at least about 0.2 part by weight of liquid HF per part by weight of toluene desired to be converted for a period of time sufficient to disproportionate toluene into said polymethyl benzene, and separating said polymethyl benzene as a disproportionation product.

2. The process of claim 1 wherein said contacting is for a sufficient period of time to permit at least about 60 to 70% conversion of toluene and said product predominates in mesitylene as the polymethyl benzene.

3. The process of claim 1 wherein said contacting is for a sufficient period of time to permit no more than about 30% conversion of toluene and said product predominates in xylene.

4. The process of claim 1 wherein said $BF_3$ and HF are each present in amounts of from 0.5 to 1.5 parts by weight per part by weight of toluene.

5. The process of claim 1 wherein benzene is also separated as a disproportionation product.

6. The process of claim 1 wherein said polymethyl benzene is a mixture of xylene and mesitylene.

7. A process for the disproportionation of toluene to produce xylene, which process comprises contacting toluene, at a temperature of about 100° C. for about 90 to 110 minutes at a pressure sufficient to maintain HF in the liquid state, with from about 0.5 to about 1.5 parts by weight of each of HF and $BF_3$ per part by weight of toluene desired to be converted, and separating xylene from the resulting product.

8. A process for the disproportionation of toluene to produce xylene, which process comprises contacting toluene, at a temperature of about 125° C. for about 40 to 45 minutes at a pressure sufficient to maintain HF in the liquid state, with from about 0.5 to about 1.5 parts by weight of each of HF and $BF_3$ per part by weight of toluene desired to be converted, and separating xylene from the resulting product.

9. A process for the disproportionation of toluene to produce mesitylene, which process comprises contacting toluene, at a temperature of about 100° C. for about 270 to 300 minutes at a pressure sufficient to maintain HF in the liquid state, with from about 0.5 to about 1.5 parts by weight of each of HF and $BF_3$ per part by weight of toluene desired to be converted, and separating mesitylene from the resulting product.

10. A process for the disproportionation of toluene to produce mesitylene, which process comprises contacting toluene, at a temperature of about 125° C. for about 100 to 120 minutes at a pressure sufficient to maintain HF in the liquid state, with from about 0.5 to about 1.5 parts by weight of each of HF and $BF_3$ per part by weight of toluene desired to be converted, and separating mesitylene from the resulting product.

No references cited.